June 30, 1959 M. F. BRADNEY 2,892,226
MOUNTING DEVICE FOR PATTERNS
Filed May 4, 1954

INVENTOR
MELVIN BRADNEY

BY *Parker and Walsh*
ATTORNEYS

2,892,226
MOUNTING DEVICE FOR PATTERNS

Melvin F. Bradney, Phoenix, Ariz., assignor of forty percent to Fred Michaels, Phoenix, Ariz.

Application May 4, 1954, Serial No. 427,508

5 Claims. (Cl. 22—157)

This invention relates to a device for mounting patterns on match plates or cope and drag plates.

The mounting of patterns on match plates in accordance with conventional practice is time consuming and costly because of the necessity of separately installing both matching dowels and bolts, as well as the further necessity of arranging the heads of the bolts in deeply countersunk recesses which must be filled with solder above the heads and the solder filed to conform to the contour of the pattern. Moreover, if the pattern has to be removed, it is difficult to melt the solder and obtain access to the bolt head because of the high heat conductivity of the aluminum patterns which rapidly draws the heat from the soldering iron.

The principal object of the invention is the provision of a device of the indicated type the use of which will substantially reduce the time and effort required to mount patterns on match plates with resultant savings in time and cost.

Another object of the invention is the provision of a device of the indicated type which is simple and easy to install and which, when installed, positively holds the patterns in position against lateral shifting movement.

A further object of the invention is the provision of a device of the indicated type which can be installed without the use of solder.

A still further object of the invention is the provision of a device of the indicated type which can be removed by a simple drilling operation without damage to the dowel holes so that the same may be used for remounting the pattern without the necessity of rematching and redrilling the holes.

Another object of the invention is the provision of a device of the indicated type adapted to serve both as a dowel and as a bolt thereby eliminating the necessity of providing a separate dowel and bolt.

These and other objects and advantages of the invention will become more apparent from the following detailed description, taken with the accompanying drawing, wherein.

Figure 1:
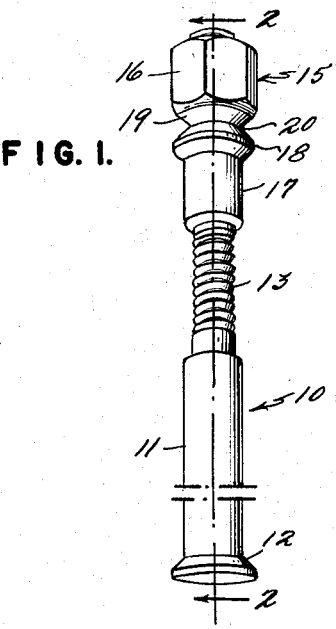
Figure 1 is a perspective view of the device of the invention.
Figure 2:
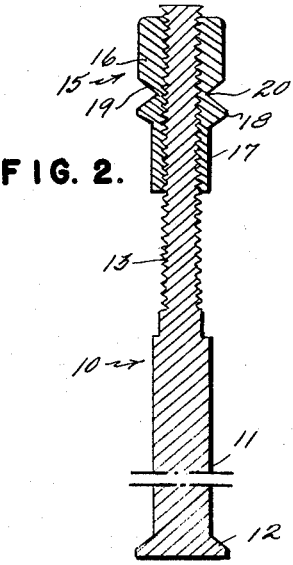
Figure 2 is a cross-sectional view of the device taken on the line 2—2 of Figure 1.

Referring to the drawing, the numeral 10 generally designates a combined dowel and bolt member having a dowel body 11, a tapered head 12 at one end of the dowel body, and a threaded bolt portion 13 at the opposite end of the dowel body. The dowel body 11 is machined to an accurate outside diameter to snugly fit the dowel holes in the patterns. The bolt portion 13 is smaller in diameter than the dowel body 11 for a purpose to be described.

The numeral 15 denotes a combined nut and dowel member having a nut portion 16 and a dowel portion 17 provided with a head 18. The nut portion 16 is separated from the head 18 by an annular groove 19 to provide a weakened portion 20. The groove 19 is preferably V-shaped in cross-section and must be accurately machined for proper break-off in a manner hereinafter described. The member 15 is provided with internal threads for threaded engagement with the bolt portion 13 and it will be noted that such threads extend throughout and full length of the combined nut and dowel member.

The device of the invention is particularly designed for mounting patterns 21 and 22 on a match plate 23. For this purpose the patterns and match plate are provided with aligned dowel openings 24, 25 and 26, the openings in the patterns being countersunk at their outer ends, as shown at 27 and 28, to receive the head 18 of the combined nut and dowel member 15 and the head 12 of the combined dowel and bolt member 10.

Figure 3:
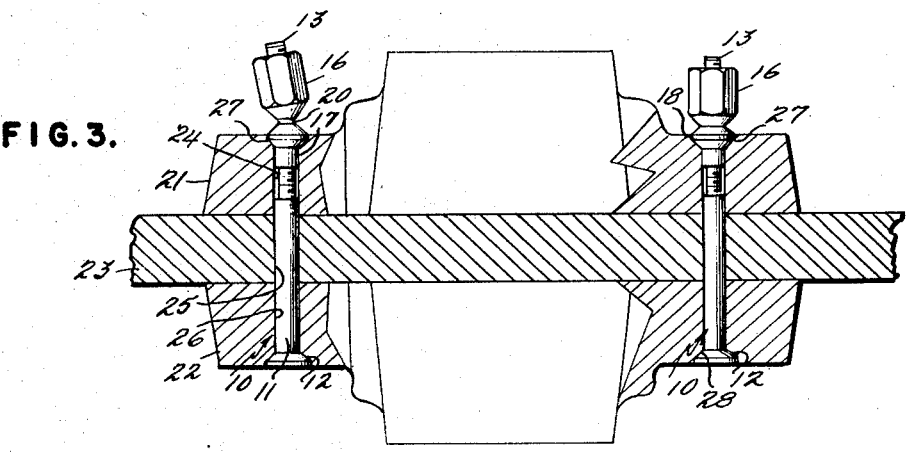
Figure 3 is a cross-sectional view illustrating the use of the device in mounting patterns on a match plate, one of the nut portions being shown after it has been broken away from the adjacent dowel portion, backed off, and bent to one side.
Figure 4:
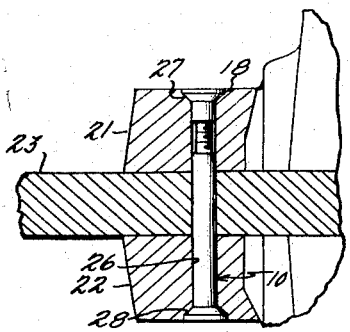
Figure 4 is a view similar to Figure 3 showing a portion of the device in a finished condition.

In assembling the patterns on the match plate the dowel openings are first aligned and the combined dowel and bolt members 10 inserted through the openings from the bottom as viewed in Figures 3 and 4. The combined nut and dowel members 15 are then threaded on the bolt portions 13 and screwed downwardly with a wrench or the like until the heads 18 firmly and tightly engage the countersinks 27. As the beveled portion of head 18 sets tightly in the countersink 27 the resistance to turning of the member 15 increases. When this resistance reaches a predetermined amount further turning of the nut portion 16 causes the weakened portion 20 to shear or break off thus separating the nut portion 16 from the dowel 17 and head 18. The nut portion 16 is then backed off about one turn and pushed from side to side until the bolt portion 13 breaks off following which the head 18 and the protruding portion of the bolt 13 are then filed to the contour of the pattern, to assume the final form shown in Figure 4.

It will thus be seen that the complete assembly operation is very simple and easily accomplished in a relatively short time. Moreover, the whole job may be done with no tools other than a wrench and file.

From the standpoint of torsional stress, the point at which the nut portion 16 will break loose from the dowel and head portion 17 and 18 will depend, of course, on the resistance of the weakened portion 20. This, in turn, depends on the accuracy with which the annular groove 19 is formed and by accurately machining such groove the point at which the break will occur can be accurately predetermined. Thus by proper design and construction the break can be made to occur after the head 18 sets tightly against the countersink in the pattern but before sufficient stress is set up to break or otherwise damage the bolt portion 13.

The use of threads throughout the full length of the member 15 has a particular advantage in that it permits the nut portion 16 to be backed off and used as a means for pushing the extended portion of the bolt portion 13 back and forth to break it off. This arrangement, moreover, definitely assures that the break will occur between the adjacent sheared edges of the nut portion 16 and the head 18, or, in other words, at approximately the same point that the nut portion 16 shears or breaks away from the head 18.

It will thus be seen that the device of the present invention greatly facilitates the mounting of patterns on match plates, in a fraction of the time previously required, and without the use of special tools or solder. Moreover, the mounting devices of the present invention may be easily removed without damage to the dowel holes in the following manner. First, the center of the end of the bolt portion 13 is located and center punched. This is very easy to do because when the head 18 is filed to the necessary contour a hair line crack appears where the bolt portion 13 comes through the head 18, enabling the pattern maker to see the approximate center of the bolt. The bolt is then drilled with a drill slightly larger than the bolt but smaller than the dowel hole. When the drill has passed through the short dowel section of the combined nut and dowel member 15, the member 10 may then be removed with no damage to the dowel holes so that they may be used again for remounting after the changes have been made in the patterns.

While a preferred embodiment of the invention has been disclosed herein, the invention is not to be construed as limited to the specific details illustrated and described except as included in the following claims.

I claim:

1. A device for mounting patterns on match plates comprising a combined dowel and bolt member and a cooperating combined nut and dowel member, said dowel and bolt member having an elongated cylindrical body portion provided at one end thereof with an enlarged head and at the opposite end thereof with a threaded shank smaller in diameter than said cylindrical body portion, said nut and dowel member having a cylindrical body portion at one end thereof, a wrench engaging portion at the opposite end thereof, and an intermediate weakened portion of reduced thickness, said nut and dowel member further having an outwardly extending beveled shoulder intermediate said cylindrical body portion and said wrench engaging portion and being internally threaded throughout its length for threaded engagement with said threaded shank portion.

2. A device for mounting patterns on match plates comprising cooperating bolt and nut members, said bolt member having an elongated cylindrical body portion and a threaded shank of less diameter than that of said cylindrical portion, said threaded portion extending from one end of the body portion, said nut member having a cylindrical body portion at one end thereof of the same size as said first mentioned cylindrical body portion, a wrench engaging portion at the opposite end thereof, and an intermediate weakened portion of reduced thickness, said nut member further having an outwardly extending beveled shoulder intermediate said cylindrical body portion and said wrench engaging portion, said nut member being internally threaded throughout its length for threaded engagement with said threaded shank portion whereby when said nut portion is broken loose from said dowel portion, said nut portion may be backed off and pushed from side to side to cause said bolt member to break at approximately the same point.

3. A device for mounting patterns on match plates comprising cooperating bolt and nut members, said bolt member having an elongated cylindrical body portion provided at one end thereof with an enlarged head and at the opposite end thereof with a threaded shank of smaller diameter than said cylindrical body portion, said nut member having a cylindrical body portion at one end thereof, a wrench engaging portion at the opposite end thereof, and an intermediate annular V-shaped groove defining a weakened portion, said nut member further having an outwardly extending beveled shoulder intermediate said cylindrical body portion and said wrench engaging portion, said nut member being internally threaded throughout its length for threaded engagement with said threaded shank portion.

4. A device for mounting patterns on match plates comprising a combined dowel and bolt member and a cooperating combined dowel and nut member, said dowel and bolt member having a cylindrical body portion of substantially greater length than the thickness of a pattern through which it is inserted and provided at one end thereof with an enlarged head and at the opposite end thereof with a threaded shank smaller in diameter than said cylindrical body portion, said nut and dowel member having a cylindrical body portion at one end thereof which is of substantial length, a wrench-engaging portion at the opposite end thereof, and an intermediate weakened portion of reduced thickness, said nut and dowel member further having an outwardly extending beveled shoulder intermediate said cylindrical body portion and said wrench-engaging portion and said nut and dowel member being internally threaded throughout its length for threaded engagement with said threaded shank portion of said dowel and bolt member.

5. A device for mounting patterns on match plates comprising a combined dowel and bolt member and a cooperating internally threaded combined dowel and nut member, said dowel and bolt member having a cylindrical body portion of substantially greater length than the combined thickness of the pattern through which it is inserted and the match plate to which said pattern is affixed, and said dowel and bolt member being provided at one end thereof with an enlarged head and at the opposite end thereof with a threaded shank substantially smaller in diameter than said cylindrical body portion, said dowel and nut member having a cylindrical portion at one end thereof which is of substantial length, a wrench-engaging portion at the opposite end thereof, and an intermediate weakened portion of reduced thickness, said dowel and nut member further having an outwardly extending beveled shoulder intermediate said cylindrical body portion and said wrench-engaging portion, and said dowel and nut member being internally threaded throughout its entire length for threaded engagement with said threaded shank portion of said dowel and bolt member.

References Cited in the file of this patent

UNITED STATES PATENTS

| | | |
|---|---|---|
| 1,533,010 | Kinslow | Apr. 7, 1925 |
| 1,677,269 | Burghart | July 17, 1928 |
| 1,696,523 | Cochran | Dec. 25, 1928 |
| 2,545,045 | Rosan | Mar. 31, 1951 |
| 2,607,446 | Rosan | Aug. 19, 1952 |

FOREIGN PATENTS

| | | |
|---|---|---|
| 741,254 | Germany | Nov. 8, 1943 |